(12) United States Patent
Chang et al.

(10) Patent No.: US 9,489,362 B2
(45) Date of Patent: Nov. 8, 2016

(54) METHOD FOR GENERATING A GRAPHICAL QUESTIONNAIRE, AND METHOD FOR FILLING IN THE GRAPHICAL QUESTIONNAIRE

(71) Applicant: MITAC INTERNATIONAL CORP, Gueishan Township (TW)

(72) Inventors: Polun Chang, Gueishan Township (TW); Sheng-Hung Chen, Gueishan Township (TW)

(73) Assignee: MITAC INTERNATIONAL CORP., Taoyuan County (TW)

( * ) Notice: Subject to any disclaimer, the term of this patent is extended or adjusted under 35 U.S.C. 154(b) by 246 days.

(21) Appl. No.: 14/225,142

(22) Filed: Mar. 25, 2014

(65) Prior Publication Data

US 2015/0278183 A1  Oct. 1, 2015

(30) Foreign Application Priority Data

Mar. 26, 2013 (TW) .............................. 102110661 A

(51) Int. Cl.
*G06F 3/00* (2006.01)
*G06F 17/24* (2006.01)
*G06Q 30/02* (2012.01)

(52) U.S. Cl.
CPC ......... *G06F 17/243* (2013.01); *G06Q 30/0203* (2013.01)

(58) Field of Classification Search
CPC .................................................. G06F 17/243
USPC ......................................................... 715/716
See application file for complete search history.

(56) References Cited

U.S. PATENT DOCUMENTS

| | | | | |
|---|---|---|---|---|
| 6,298,347 | B1* | 10/2001 | Wesley | G06F 17/243 |
| 7,822,816 | B2* | 10/2010 | Payne | G06Q 10/10 709/203 |
| 7,958,457 | B1* | 6/2011 | Brandenberg | G06F 1/1613 715/789 |
| 2004/0034684 | A1* | 2/2004 | Payne | G06Q 10/10 709/201 |
| 2005/0086587 | A1* | 4/2005 | Balz | G06Q 30/02 715/221 |
| 2009/0074303 | A1* | 3/2009 | Filimonova | G06K 9/00449 382/224 |
| 2009/0115969 | A1* | 5/2009 | Chen | G03B 21/26 353/28 |
| 2012/0117540 | A1* | 5/2012 | Hagerty | G06F 17/30398 717/120 |
| 2013/0318149 | A1* | 11/2013 | Chang | G06F 9/4443 709/203 |

* cited by examiner

*Primary Examiner* — William Titcomb
(74) *Attorney, Agent, or Firm* — Ladas & Parry, LLP

(57) ABSTRACT

In a questionnaire generating method for generating a graphical questionnaire, an electronic device provides a graphical element on a display, an editing interface that enables user input of graphical element information related to the graphical element, and an editing interface that enables user input of question information related to the question. Subsequently, the electronic device forms a schematic diagram that represents an object of interest using the graphical element and the graphical element information on the display, and generates the graphical questionnaire using the schematic diagram and the question information.

8 Claims, 6 Drawing Sheets

70 editing interface

71 -- serial number of the graphical element ☐☐☐☐ name of the graphical element ☐☐☐☐☐

72 -- category number of the question
☐☐☐☐☐ body of the question
☐☐☐☐☐☐☐☐☐☐☐☐☐ selection
color
☐ yellowish pigmentation ☐ hot flashes
☐ pale ☐ others moisture
☐ dry ☐ moist remarks

FIG. 4

METHOD FOR GENERATING A GRAPHICAL QUESTIONNAIRE, AND METHOD FOR FILLING IN THE GRAPHICAL QUESTIONNAIRE

CROSS-REFERENCE TO RELATED APPLICATION

This application claims priority from Taiwanese Application No. 102110661, filed on Mar. 26, 2013 at the Taiwanese Intellectual Property Office, the disclosure of which is incorporated in its entirety herein by reference.

BACKGROUND OF THE INVENTION

1. Field of the Invention

The invention relates to a method for generating a graphical questionnaire, and a method for filling in the graphical questionnaire.

2. Description of the Related Art

A questionnaire is a common method for gathering information from subjects. Conventionally, a questionnaire is constructed by listing a series of designed questions on sheets and handed out to subjects. Alternatively, the questionnaire may be distributed electronically in a form of spreadsheet. After the desired information is gathered, the information may be further analyzed and presented using a graph and/or chart.

However, it is noted that the questionnaire may be related to some specific parts of an object of interest such as human body, product, geographic location, etc. It would be beneficial to construct a questionnaire that can be presented in a form of a schematic diagram, so as to provide a visual correspondence between the questionnaire and the object of interest.

SUMMARY OF THE INVENTION

Therefore, one object of the present invention is to provide a method for generating a graphical questionnaire that can be presented in a form of a schematic diagram.

Accordingly, a questionnaire generating method of the present invention is for generating a graphical questionnaire containing a schematic diagram to represent an object of interest and further containing a question associated with the object of interest. The questionnaire generating method is to be implemented using an electronic device coupled to a display, and includes the following steps of:

(a) providing, by the electronic device, a graphical element on the display;

(b) providing, by the electronic device, an editing interface that enables user input of graphical element information related to the graphical element;

(c) providing, by the electronic device, an editing interface that enables user input of question information related to the question associated with the object of interest; and (d) forming, by the electronic device, the schematic diagram using the graphical element and the graphical element information on the display, and generating the graphical questionnaire using the schematic di agram and the question information.

Another object of the present invention is to provide a questionnaire survey method for filling a graphical questionnaire generated using the aforementioned graphical questionnaire generating method. The questionnaire survey method is to be implemented using an electronic device coupled to a display, and includes the following steps of:

displaying, by the electronic device, the graphical questionnaire on the display;

upon receipt of an activation command that is directed to a selected one of the graphical elements, displaying, by the electronic device, question information of a question associated with the selected one of the graphical elements on the display; and receiving, by the electronic device, user input of an answer to the question.

BRIEF DESCRIPTION OF THE DRAWINGS

Other features and advantages of the present invention will become apparent in the following detailed description of the preferred embodiment with reference to the accompanying drawings, of which:

FIG. 4 illustrates an editing interface that enables user input of question information related to a question;

DETAILED DESCRIPTION OF THE PREFERRED EMBODIMENT

Figure 1:
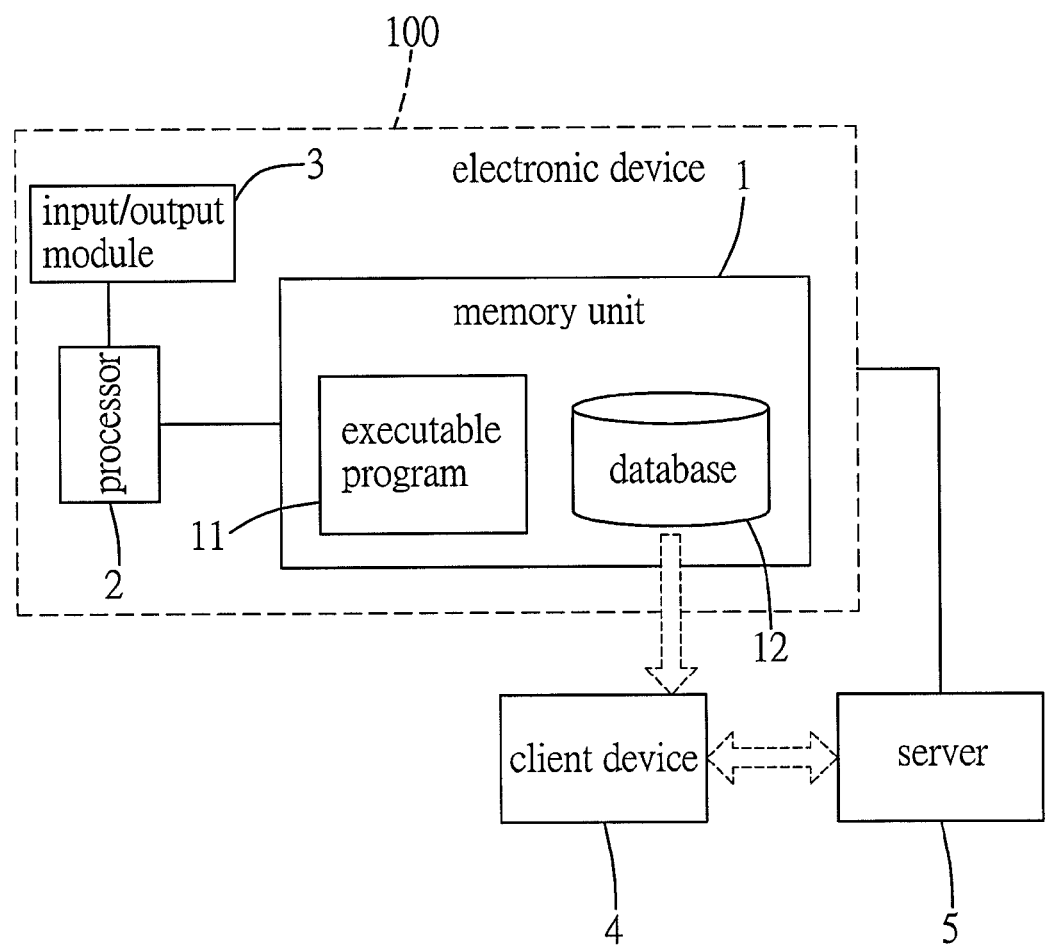
FIG. 1 is a block diagram of an electronic device that is used to implement a questionnaire generating method of a preferred embodiment according to the pre sent invention.
Figure 2:
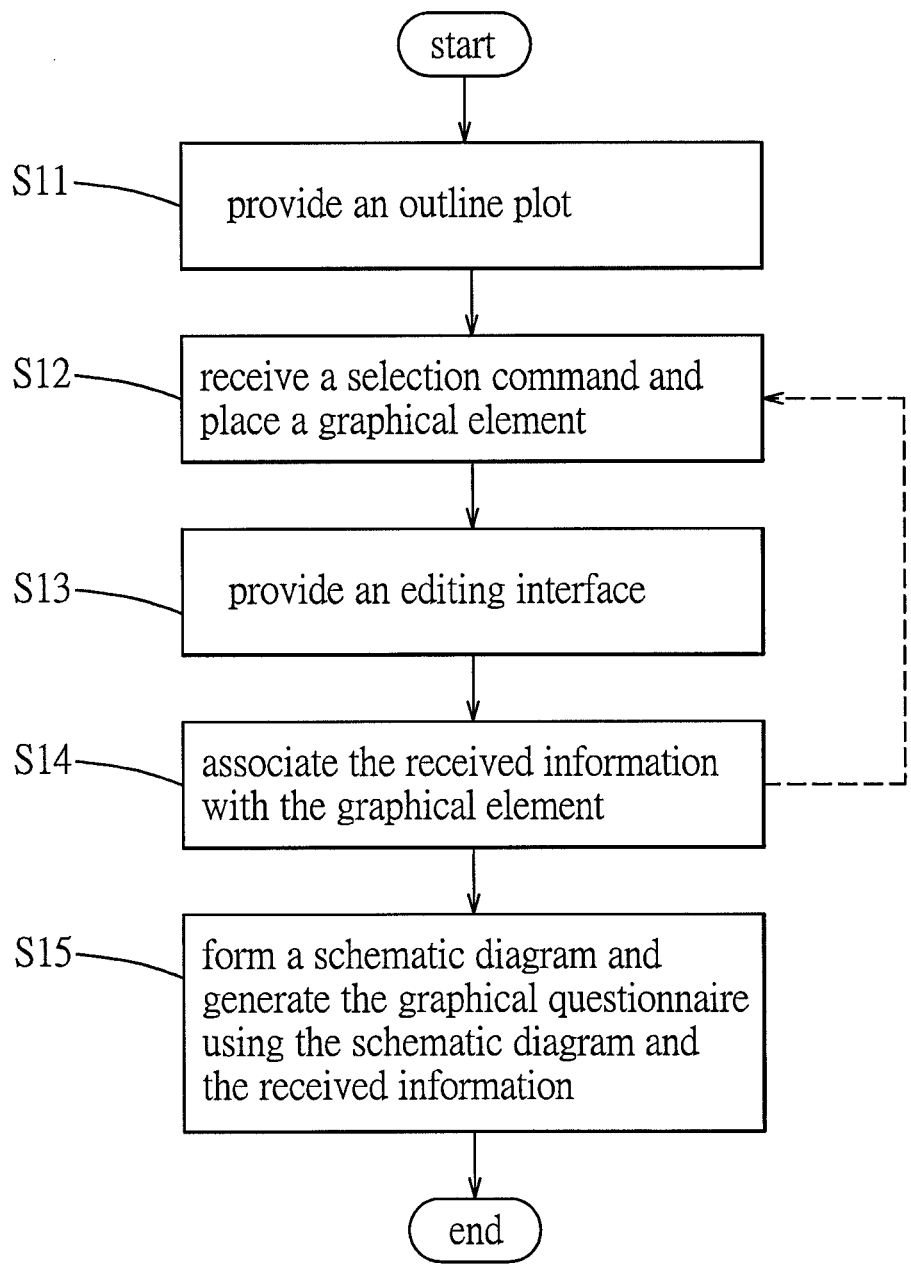
FIG. 2 is a flow chart of the questionnaire generating method of the preferred embodiment.
Figure 3:
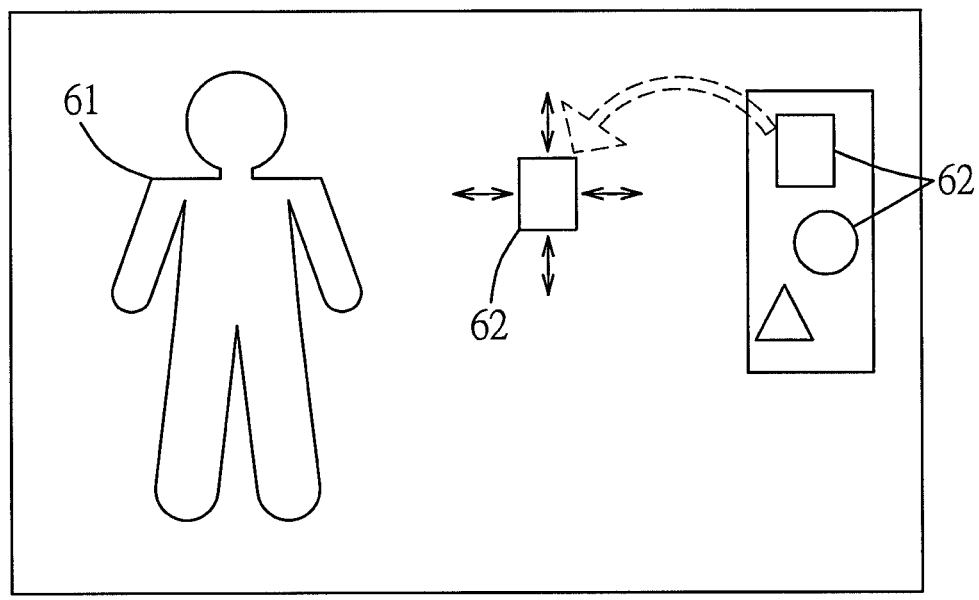
FIG. 3 illustrates an editing interface that enables a user to arrange a graphical element on a display of the electronic device.

As shown in FIG. 1, the preferred embodiment of a questionnaire generating method for generating a graphical questionnaire according to the present invention is implemented using an electronic device 100.

In this embodiment, the electronic device 100 may be, for example, a desktop computer, a laptop computer, a tablet computer, etc. The electronic device 100 includes a memory unit 1, a processor 2 coupled to the memory unit 1, and an input/output module 3 coupled to the processor 2.

The input/output module 3 allows interaction between the electronic device 100 and a user, and may be embodied by a combination of a keyboard, a mouse and a display. In some embodiments, the input/output module 3 may be embodied by a touch screen, or other mechanisms that are capable of displaying information to a user. In practice, a display is required in the input/output module 3 for illustrating the graphical questionnaire to the user.

The electronic device 100 is operable to communicate with a client device 4 and a server 5 for transmitting the graphical questionnaire thereto. The client device 4 may be a portable electronic device allowing a user to administer the graphical questionnaire, and includes a display for illustrating the graphical questionnaire to the user. Information obtained via administering the graphical questionnaire may be subsequently transmitted to the server 5 for analysis.

The memory unit 1 stores an executable program 11, and a database 12 therein. When executed by the processor 2, the executable program 11 is operable to cause the processor 2 to perform steps of the questionnaire generating method.

Referring to FIGS. 2 to 5, the questionnaire generating method for generating the graphical questionnaire will now be described.

In step S11, the electronic device 100 provides an outline plot 61 of an object of interest, and a plurality of graphical elements 62 on the display of the electronic device 100. The graphical elements 62 are stored in the database 12, and are listed and displayed in an element selection area 63 on the display.

The object of interest may be an object that is relevant to the graphical questionnaire to be generated. For example, if the graphical questionnaire is related to health information, the object of interest may be a human body. In other embodiments, the object of interest may be a vehicle, a geographical location, a building, etc.

The graphical elements 62 are provided for a questionnaire constructor to establish correspondences to various parts of the object of interest. For example, the graphical elements 62 may be placed on parts of the outline plot 61 such as head, limbs, torso, etc. In this embodiment, the graphical elements 62 are in a form of blocks, and are selected from the database 12.

In step S12, the electronic device 100 receives, from the questionnaire constructor, a selection command that selects one of the graphical elements 62. The selection command may be issued by the user clicking on the selected one of the graphical elements 62 using the mouse, or touching the selected one of the graphical elements 62 on the touch screen. Subsequently, the selected one of the graphical elements 62 can be moved (e.g., dragged) from the element selection area 63 to a desired location on the outline plot 61.

In this embodiment, when one of the graphical elements 62 is selected and dragged from the element selection area 63, a graphical element 62 identical to the selected one is automatically replenished in the element selection area 63. In some embodiments, the selected graphical element 62 may not be replenished.

In some embodiments, the executable program 11 may cause the electronic device 100 to provide a scaling function for the questionnaire constructor to adjust a size of the selected one of the graphical elements 62 and/or an orientating function for the questionnaire constructor to orientate the selected one of the graphical elements 62.

Then, when the electronic device 100 receives an editing command that is directed to the selected one of the graphical elements 62 from the questionnaire constructor, the electronic device 100 provides an editing interface 70 in step S13.

An exemplary editing interface 70 is shown in FIG. 4. The editing interface 70 includes a graphical element information field 71 that enables user input of graphical element information related to the selected one of the graphical elements 62, and a question information field 72 that enables user input of question information related to the question associated with the object of interest.

Preferably, the graphical element information includes a serial number of the graphical element 62 and a name of the graphical element 62. For example, when the questionnaire constructor intends to designate the graphical element 62 to the left thumb of the human body, the serial number may be "F1" and the name may be "left thumb".

The question information includes a type of the question, a body of the question, a plurality of possible selections, and a remark about the question.

The type of the question may be represented by a category number. For example, a true-or-false question may be represented by 1, a single choice question may be represented by 2, a multiple choice question may be represented by 3, etc.

The body of question is something descriptive about the desired information. For example, when the desired information is the appearance of the left thumb, the body of question may read "How does the left thumb look?". When selections describing the appearance of the left thumb are provided, the category number may be 2 or 3. The selections may include "yellowish pigmentation", "hot flashes", "pale", "others", "dry", "moist", etc.

Afterward, in step S14, the electronic device 100 associates the received graphical element information and question information with the graphical element 62, and saves the aforementioned changes. Therefore, steps S12-S14 may be considered as a procedure for constructing one question of the graphical questionnaire.

In embodiments where multiple questions are needed to be constructed (e.g., for a complete physical examination), steps S12-S14 may be repeated for providing a plurality of graphical elements 62 each associated with respective graphical element information and part of the question information. For example, additional graphical elements 62 may be dragged to the head of the outline plot 61, the left shoulder of the outline plot 61, and the right thigh of the outline plot 61, respectively, and corresponding editing may be performed.

Figure 5:
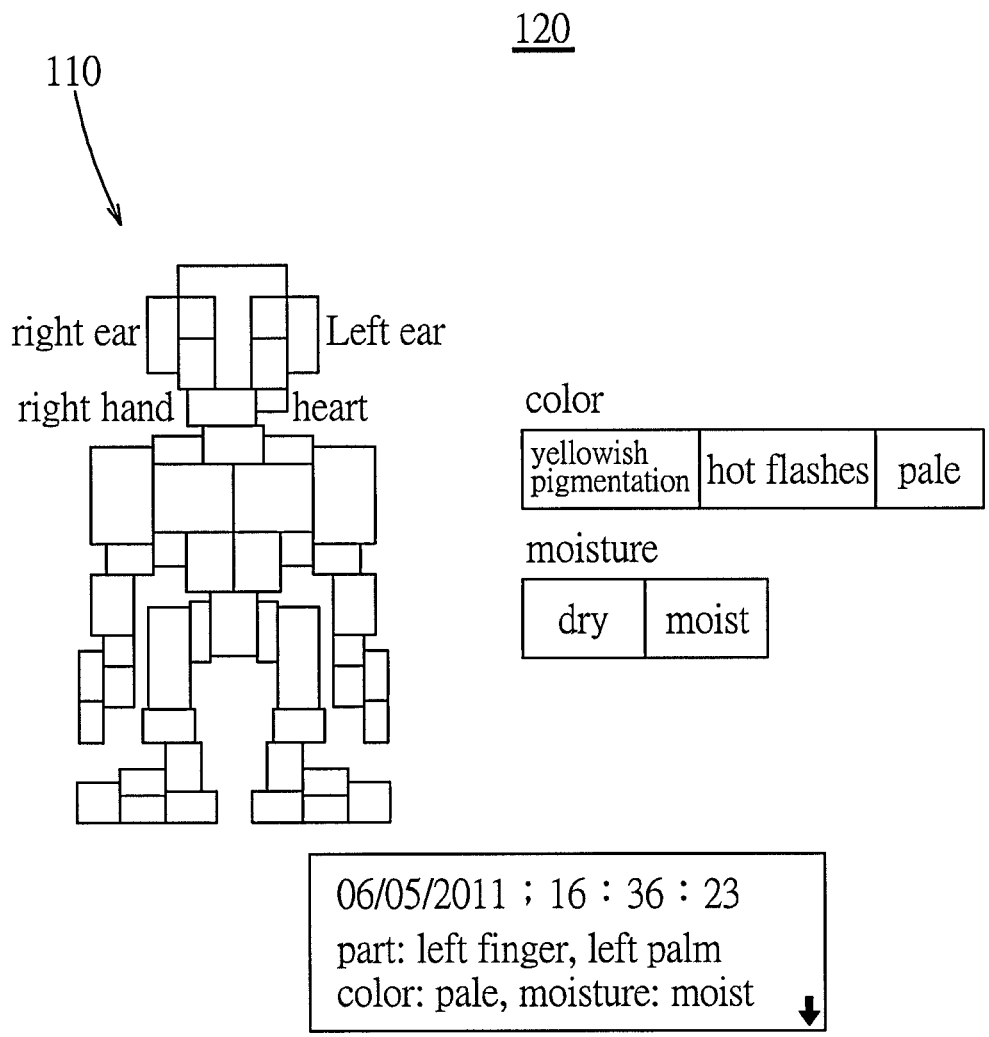
FIG. 5 illustrates a graphical questionnaire that is generated using the questionnaire generating method of the preferred embodiment.

After all required questions are constructed, in step S15, the electronic device 100 forms a schematic diagram 110 that represents the object of interest (i.e., the human body), and that is to be contained in the graphical questionnaire 120 using the graphical elements 62 and the graphical element information on the display. As shown in FIG. 5, the schematic diagram 110 is formed by piecing together the graphical elements 62. Specifically, the graphical elements 62 are placed on a part of the outline plot 61, and the schematic diagram 110 is formed according to the outline plot 61.

Moreover, the electronic device 100 generates the graphical questionnaire 120 using the schematic diagram 110 and the question information (see FIG. 5), and stores the graphical questionnaire 120 in the memory unit 1. In some embodiments, when the graphical questionnaire 120 is generated, a copy thereof may be transmitted to the server 5.

It is worth noting that, in some embodiments, the provision of the outline plot 61 is not mandatory. That is, a user may attempt to assemble the object of interest on the display using the graphical elements 62, and step S11 may be omitted.

In some embodiments, a particular part of question information may be stored separately to be associated with other questions. For example, when a question related to skin condition of the left thumb of the human body is constructed, the question information may be used in other questions which are related to skin conditions of various parts of the human body.

The graphical questionnaire 120 generated through the questionnaire generating method may be downloaded from the electronic device 100 or the server 5 to the client device 4. The client device 4 stores the proper software program to load the graphical questionnaire 120 for a user to fill out the graphical questionnaire 120. For example, a graphical questionnaire 120 associated with physical examination (i.e., object of interest is the human body) may be administered by a physician presenting the questions to a patient orally.

Figure 6:
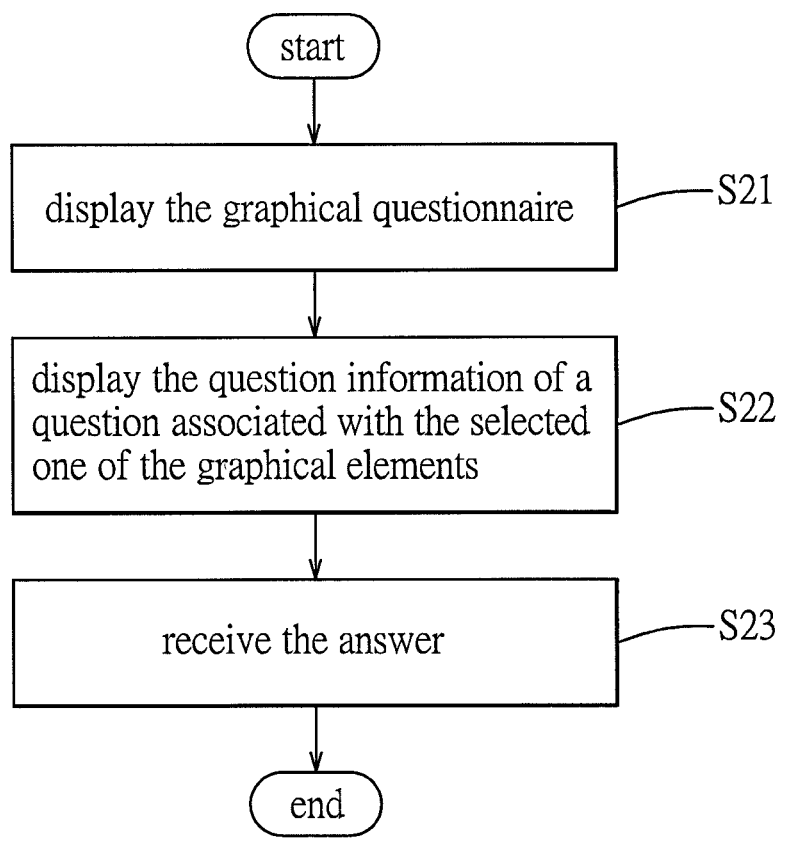
FIG. 6 is a flow chart of a questionnaire survey method of the preferred embodiment.

Referring to FIG. 6, a questionnaire survey method for filling the graphical questionnaire 120 according to the present invention will now be described. In this embodiment, the client device 4 is operated by an interviewer who intends to obtain information from a respondent.

In step S21, the client device 4 displays the graphical questionnaire 120, instructing the interviewer to select one of the graphical elements 62 on the schematic diagram 110.

In step S22, upon receipt of an activation command that is directed to a selected one of the graphical elements 62 from the interviewer, the client device 4 displays the question associated with the selected one of the graphical elements 62 on the display.

After obtaining an answer from the respondent, in step S23, the client device 4 receives the answer inputted by the interviewer.

Steps S22 and S23 may be repeated to fill out other questions in the graphical questionnaire 120. After all the questions are filled out, in step S24, the client device 4 stores the answers and transmits the same to the server 5 for further analysis.

To sum up, the present invention provides a method to conveniently generate a graphical questionnaire that is visually associated with an object of interest. The graphical questionnaire generated by the method of the present invention may be applicable in various fields such as healthcare, automobile repair, building safety evaluation, and tourism.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A questionnaire generating method for generating a graphical questionnaire containing a schematic diagram to represent an object of interest and further containing a question associated with the object of interest, said questionnaire generating method to be implemented using an electronic device coupled to a display, and comprising the following steps of:
   (a) providing, by the electronic device, a graphical element on the display;
   (b) providing, by the electronic device, an editing interface that enables user input of graphical element information related to the graphical element;
   (c) providing, by the electronic device, an editing interface that enables user input of question information related to the question associated with the object of interest; and
   (d) forming, by the electronic device, the schematic diagram using the graphical element and the graphical element information on the display, and generating the graphical questionnaire using the schematic diagram and the question information;
   wherein the object of interest corresponds to a real-life object relevant to the graphical questionnaire to be generated; and
   the method further comprising, before step (a), a step of providing, by the electronic device, an outline plot of the object of interest on the display;
   wherein in step (d), the graphical element is placed on a part of the outline plot, and the schematic diagram is formed according to the outline plot.

2. The questionnaire generating method of claim 1, wherein steps (a) and (b) are repeated for providing a plurality of graphical elements each associated with respective graphical element information and a part of the question information, and in step (d), the electronic device is programmed to form the schematic diagram using the graphical elements.

3. The questionnaire generating method of claim 1, the electronic device including a database that stores image blocks therein, wherein, in step (a), the electronic device provides one of the image blocks stored in the database to show in the display as the graphical element.

4. The questionnaire generating method of claim 1, further comprising, after step (a), at least one of the following steps of:
   providing, by the electronic device, a scaling function to adjust a size of the graphical element; and
   providing, by the electronic device, an orientating function to orientate of the graphical element.

5. The questionnaire generating method of claim 1, wherein, in step (b), the graphical element information includes at least one of a serial number and a name of the graphical element.

6. The questionnaire generating method of claim 1, wherein the question information includes at least one of a type of the question, a body of the question, a plurality of possible selections, and a remark about the question.

7. A questionnaire survey method for filling a graphical questionnaire generated using a graphical questionnaire generating method of claim 1, said questionnaire survey method to be implemented using an electronic device coupled to a display, and comprising the following steps of:
   displaying, by the electronic device, the graphical questionnaire on the display;
   upon receipt of an activation command that is directed to a selected one of the graphical elements, displaying, by the electronic device, question information of a question associated with the selected one of the graphical elements on the display; and
   receiving, by the electronic device, user input of an answer to the question.

8. The questionnaire survey method of claim 7, further comprising transmitting, by the electronic device, the answer to a server.

* * * * *